United States Patent [19]
Göckler et al.

[11] Patent Number: 5,461,612
[45] Date of Patent: Oct. 24, 1995

[54] DROP-AND-ADD MULTIPLEXER FOR CONVERTING AND PROCESSING A FREQUENCY MULTIPLEX SIGNAL

[75] Inventors: Heinz Göckler, Backnang; Karlheinz Grotz, Fellbach, both of Germany

[73] Assignee: ANT Nachrichtentechnik GmbH, Backnang, Germany

[21] Appl. No.: 327,858

[22] Filed: Oct. 24, 1994

[30] Foreign Application Priority Data

Oct. 30, 1993 [DE] Germany ............... 43 37 135.3

[51] Int. Cl.$^6$ ............... H04Q 11/02; H04J 1/04
[52] U.S. Cl. ............... 370/55; 370/123
[58] Field of Search ............... 370/55, 112, 69.1, 370/120, 121, 123, 124, 70

[56] References Cited

U.S. PATENT DOCUMENTS

| | | | |
|---|---|---|---|
| 4,999,831 | 3/1991 | Grace | 370/69.1 |
| 5,177,700 | 1/1993 | Göckler | 364/724.1 |
| 5,247,515 | 9/1993 | White | 370/69.1 |

FOREIGN PATENT DOCUMENTS

| | | |
|---|---|---|
| 0339037B1 | 2/1993 | European Pat. Off. . |
| 4026477A1 | 3/1992 | Germany . |
| 4041632A1 | 7/1992 | Germany . |

*Primary Examiner*—Benedict V. Safourek
*Assistant Examiner*—Ricky Ngo
*Attorney, Agent, or Firm*—Spencer, Frank & Schneider; Christopher H. Lynt

[57] ABSTRACT

A drop-and-add multiplexer for receiving an incoming FDM signal with a plurality of channels, for receiving signals of additional channels, and for outputting an outgoing FDM signal. The multiplexer includes at least one single channel filter for receiving an incoming FDM signal, filtering the incoming FDM signal by blocking a selected channel frequency, and outputting a filtered FDM signal. At least one interpolating digital frequency converter receives another channel signal which is not in the incoming FDM signal, converts the other channel signal into a channel frequency which has been blocked by the at least one single channel filter or was an empty channel frequency in the incoming FDM signal, and outputs a converted other channel signal. At least one digital frequency converter is provided and includes a cascade connection of a decimating digital frequency converter and an interpolating digital frequency converter, for receiving the incoming FDM signal, frequency-converting a selected channel from an input frequency to a different outgoing frequency, and outputting a frequency-converted channel signal. An adder adds the converted other channel signal output by the interpolating digital frequency converter, the filtered FDM signal output by the single channel filter, and the frequency-converted channel signal output by the digital frequency converter, and outputs an outgoing FDM signal.

18 Claims, 8 Drawing Sheets

DROP-AND-ADD MULTIPLEXER FOR CONVERTING AND PROCESSING A FREQUENCY MULTIPLEX SIGNAL

BACKGROUND OF THE INVENTION

1. Field of The Invention

The invention relates to a drop-and-add multiplexer for converting a frequency division multiplexed (FDM) signal with a large amount of channels and for receiving signals of additional channels.

2. Background Information

Digital frequency converters which generate frequency multiplex signals, particularly those of a large band width and high scanning frequency, by single channel conversion in interpolating digital frequency converters are known from German Published, Non-Examined Patent Applications 40 26 477 and 40 41 632, wherein a digital frequency multiplex conversion method with super scanning is described.

It is thus possible by conventional means to split a defined digital FDM signal into separate partial signals by means of decimating digital frequency converters, to regroup these signals or to replace some signals by others, and to combine them afterwards into a new FDM signal by means of interpolating digital frequency converters in a digital frequency converter (see FIG. 1).

Given the assumption that the same number of channels are occupied in the original FDM incoming signal and the modified FDM outgoing signal (I=J), FIG. 1 shows how incoming channel signal "i" is replaced by an outgoing new channel signal "j." In this case the decimating digital frequency converter DDFUi can be omitted.

The channel signals mutually contained in both FDM signals can be located, depending on the selection of the respective converter frequency, in different channel frequencies $f_{iin} \neq f_{out}$ ($f_{in}$, $f_{out}$ are the channel frequencies, i.e., the position of the channels in the FDA-spectrum).

It is also possible that I≠J, in which case all decimating digital frequency converters (DDFU's) for channel signals to be eliminated can of course be omitted.

SUMMARY OF THE INVENTION

It is the object of the present invention to greatly reduce the outlay for a digital drop-and-add frequency multiplexer, while at the same time, the free availability regarding the occupation of the channels is to be fully maintained.

This object is attained in one embodiment by a drop-and-add multiplexer for receiving an incoming FDM signal with a plurality of channels, for receiving signals of additional channels, and for outputting an outgoing FDM signal. The multiplexer comprises at least one single channel filter means for receiving an incoming FDM signal, filtering the incoming FDM signal by blocking a selected channel frequency, and outputting a filtered FDM signal. At least one interpolating digital frequency converter is provided for receiving another channel signal which is not in the incoming FDM signal, converting the other channel signal into a channel frequency which has been blocked by the at least one single channel filter means or was an empty channel frequency in the incoming FDM signal, and outputting a converted other channel signal. At least one digital frequency converter is provided comprising a cascade connection of a decimating digital frequency converter and an interpolating digital frequency converter, for receiving the incoming FDM signal, frequency-converting a selected channel from an input frequency to a different outgoing frequency, and outputting a frequency-converted channel signal. Adding means is provided for adding the converted other channel signal output by the interpolating digital frequency converter, the filtered FDM signal output by the single channel filter means, and the frequency-converted channel signal output by the digital frequency converter, and outputting an outgoing FDM signal.

In a further embodiment, the single channel filter means comprises a first path for receiving the incoming FDM signal and producing an output signal, a second path for receiving the incoming FDM signal and producing an output signal, and an adder for adding the output signals of the first and second paths. The first path includes means for connecting the incoming FDM signal through as the output signal to the adder. The second path has a single channel band filter for receiving and filtering the incoming FDM signal, and has a sign inverter for inverting the filtered FDM signal and outputting the inverted filtered FDM signal as the output signal to the adder.

Advantageously, in a further embodiment, the single channel band filter comprises a cascade connection of a digital decimating frequency converter and an interpolating digital frequency converter. In another embodiment, the digital decimating frequency converter comprises a cascade connection of a complex decimating band filter, a first complex mixer, and a complex half-band filter. In another embodiment, a single decimating digital frequency converter is provided as the decimating digital frequency converter of the at least one digital frequency converter and as the decimating digital frequency converter of the single channel band filter, wherein an output signal of the single decimating digital frequency converter is provided to both the interpolating digital frequency converter of the at least one digital frequency converter and to the interpolating digital frequency converter of the single channel band filter.

In a further embodiment, the interpolating digital frequency converter of the at least one digital frequency converter and the interpolating digital frequency converter of the single channel band filter, comprise a single interpolating digital frequency converter, the single digital decimating frequency converter comprises a cascade connection of a complex decimating band filter, a first complex mixer, and a complex half-band filter, and the single interpolating digital frequency converter comprises a cascade connection of a complex decimating half-band filter, a second complex mixer, a pair of real filters, a pair of interpolating half-band filters, a third complex mixer, and a first interpolating complex band filter.

According to a further embodiment, the means for connecting of the first path comprises delay means for compensating for a time delay of the single channel band filter in the second path, wherein the incoming FDM signal is delayed in the first path by the delay means to have the same time delay as the single channel band filter of the first path.

In an alternative embodiment, a drop-and-add multiplexer is provided for receiving an incoming FDM signal with a plurality of channels, for receiving signals of additional channels, and for outputting an outgoing FDM signal, the multiplexer including means for replacing a channel in the incoming FDM signal with a new channel signal in the outgoing FDM signal. The means for replacing comprises a first path and a second path, the first path and the second path receiving the incoming FDM signal. The first path includes a delay means for receiving the incoming FDM signal and outputting a delayed signal. The second path includes a decimating digital frequency converter and an inverter for receiving the incoming FDM signal and outputting an inverted output signal, an adder for receiving the inverted output signal from the decimating digital frequency converter, for receiving a new channel signal which is not in the incoming FDM signal with positive or negative signs, and for producing an added output signal, and an interpolating digital frequency converter for receiving the added output signal and producing an output signal. The delayed signal from the first path and the output signal from the interpolating digital frequency converter of the second path are combined in a further adder to produce the outgoing FDM signal. In this way, a channel signal in the incoming FDM signal to be replaced is eliminated in the outgoing FDM signal and replaced by the new channel signal.

Advantageous further embodiments will become apparent from considering the detailed description taken with the drawings. The drop-and-add multiplexer of the invention has the advantages of a considerably reduced outlay with the free availability regarding the occupation of channels maintained.

BRIEF DESCRIPTION OF THE DRAWINGS

The above and other features and advantages of embodiments of the invention will become apparent from the following detailed description taken with the drawings in which.

DETAILED DESCRIPTION OF THE PREFERRED EMBODIMENTS

The following detailed description of the preferred embodiments is presented by way of example, and should not be construed as strictly limiting the invention to the particular structure disclosed. There may be various modifications and equivalents which are considered to be within the scope of the invention as defined by the claims.

Figure 2:
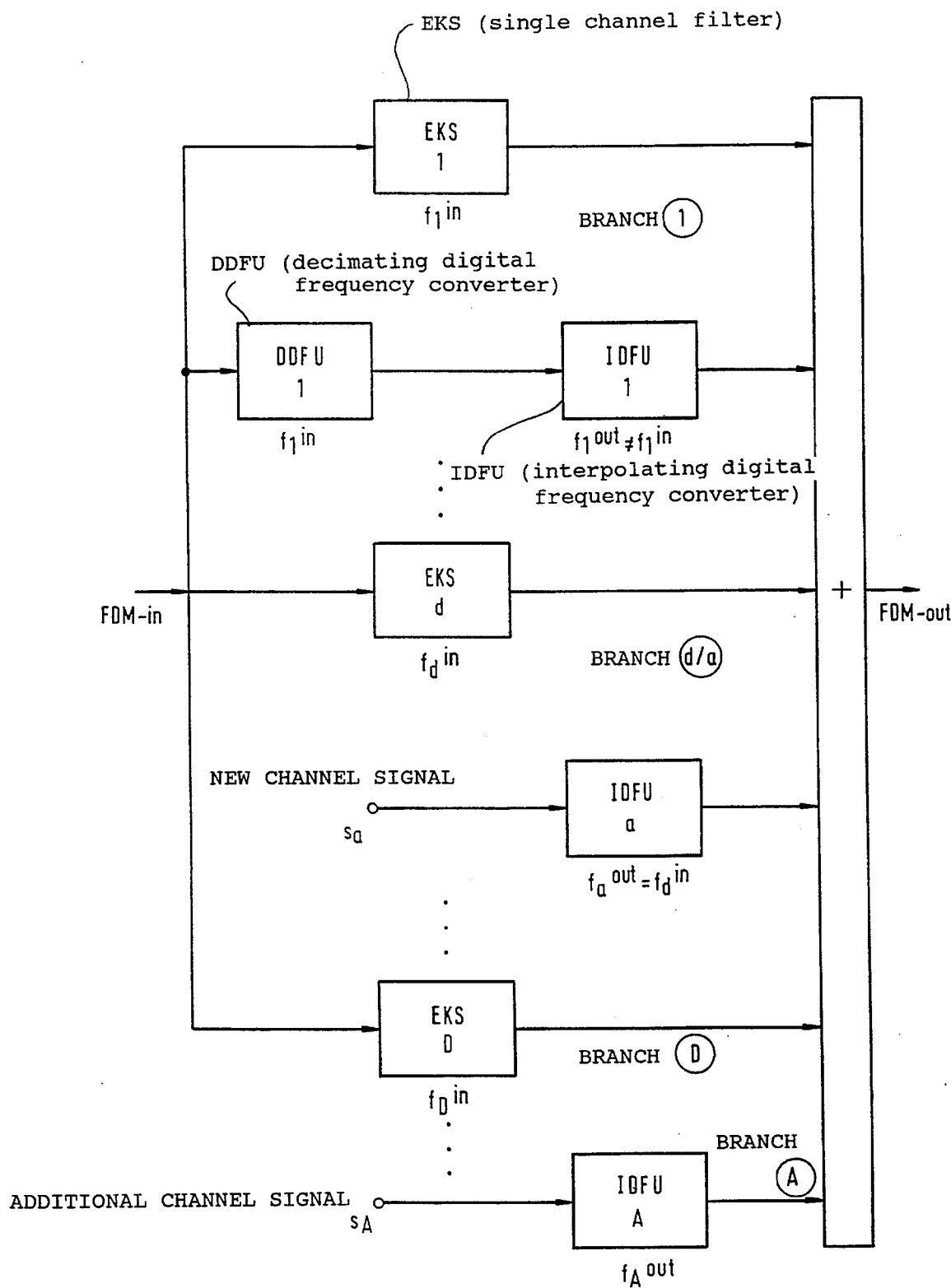
FIG. 2 shows the principle of the drop-and-add frequency multiplexer in accordance with the invention.

The basic structure of one embodiment of a digital drop-and-add multiplexer circuit arrangement in accordance with the invention is represented in FIG. 2. Four branches labelled "BRANCH 1", "BRANCH d/a", "BRANCH D" and "BRANCH A", which serve different functions, have been emphasized for purposes of discussion.

In BRANCH 1, the channel located at $f_1$in is tuned out of the incoming FDM-in signal by means of highly selective single channel notch filter EKS1, i.e., a broadband filter with a narrow stop gap. This channel signal is also separated by means of digital decimating frequency converter DDFU1 and reinserted by means of a downstream interpolating digital frequency converter IDFU1 into an empty channel of the outgoing FDM-out signal where $f_1$out≠$f_1$in. A change of the channel arrangement or channel occupation is caused in BRANCH 1, thus realizing a reallocation or add/drop branch, i.e., the channel output frequency does not equal the channel input frequency, $f_{out} \neq f_{in}$.

In BRANCH d/a (drop/add branch), an incoming channel signal at $f_d$in is replaced by a new one which was not present in the incoming FDM signal. For this purpose the channel signal located at $f_d$in is eliminated from the incoming FDM-in signal by means of single channel filter EKSd in the drop portion of the branch. The new channel signal $s_a$ is inserted exactly into this channel in the add portion of the branch by means of an interpolating digital frequency converter IDFUa, where $f_a$out=$f_d$in. Thus, a drop-add branch is realized where an incoming channel signal is dropped, a new channel signal is added, and the channel input and output frequency is the same, $f_{out}=f_{in}$, in contrast to BRANCH 1.

BRANCH D (drop branch) causes the elimination of a channel signal at $F_D$in the same way as already described in connection with BRANCH 1, through single channel filter EKSD, but without this signal appearing in the output signal FDM-out at another frequency (as in BRANCH 1), and without another channel signal being inserted into the frequency gap created (as in BRANCH d/a).

In BRANCH A (add branch), an additional channel signal $s_A$ is added into an available frequency gap at $f_A$out with interpolating digital frequency converter IDFUA.

Figure 1:
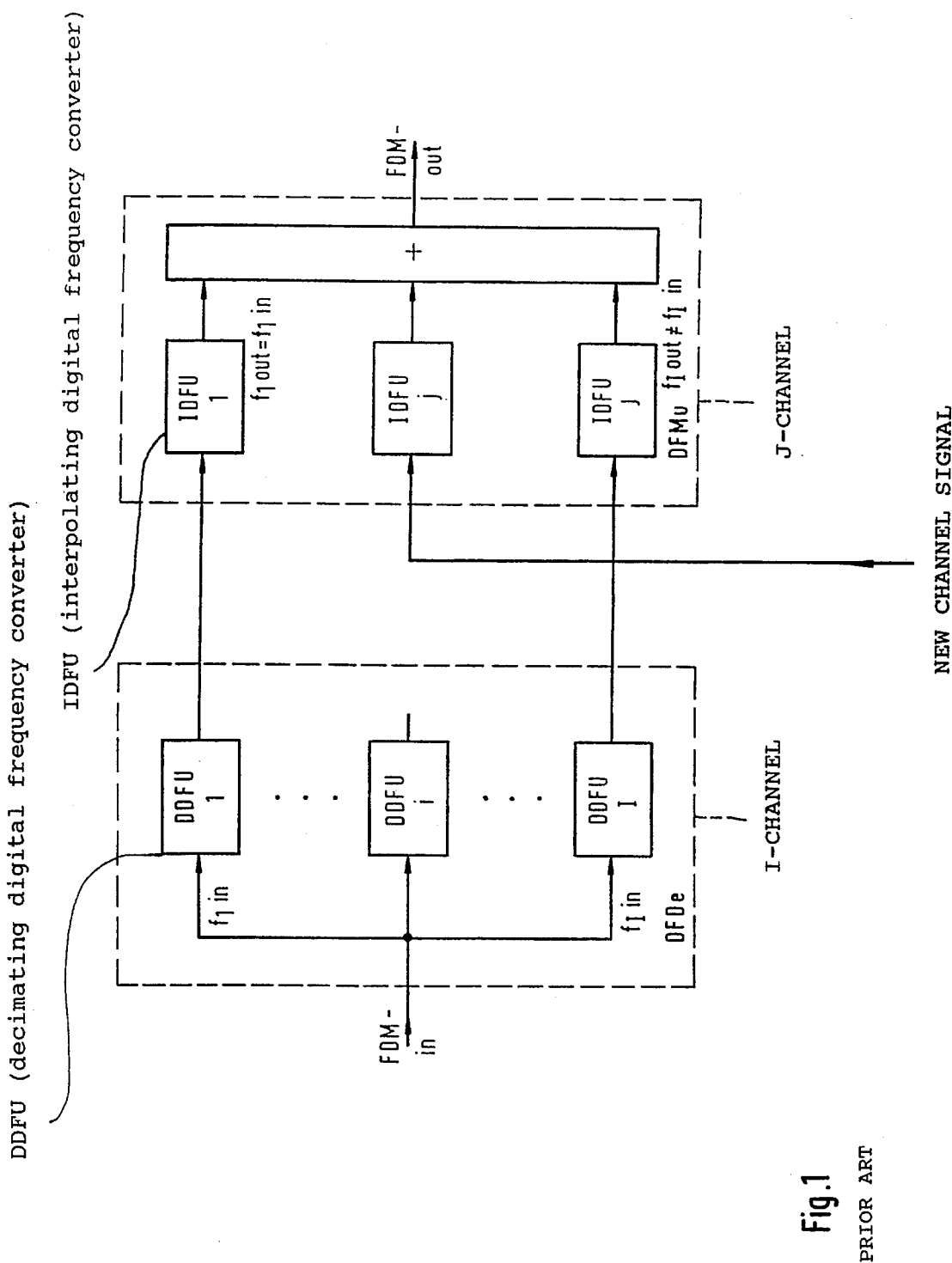
FIG. 1 shows a block diagram of a digital frequency converter of the prior art.

As a rule, in a digital drop-and-add frequency multiplexer, the number D of channels to be eliminated is low with respect to the number input I, and the number A of channels to be added is low with respect to the number output J. For this reason, the total outlay for the embodiment of a device in accordance with the present invention as shown in FIG. 2 is clearly reduced by comparison with the conventional digital frequency converter of FIG. 1, even though nothing is originally known regarding the outlay for single channel filter EKS.

Figure 3:
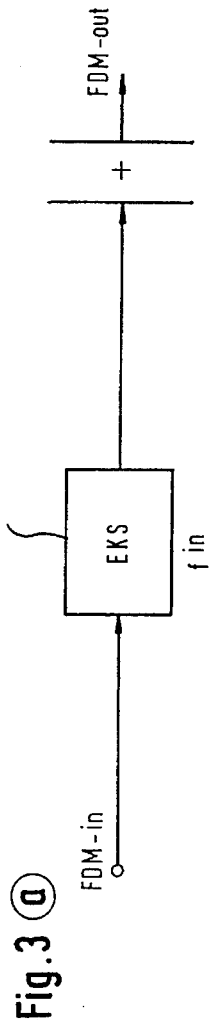
FIGS. 3a, 3b and 3c show three possibilities for realizing a single channel block.
Figure 3:
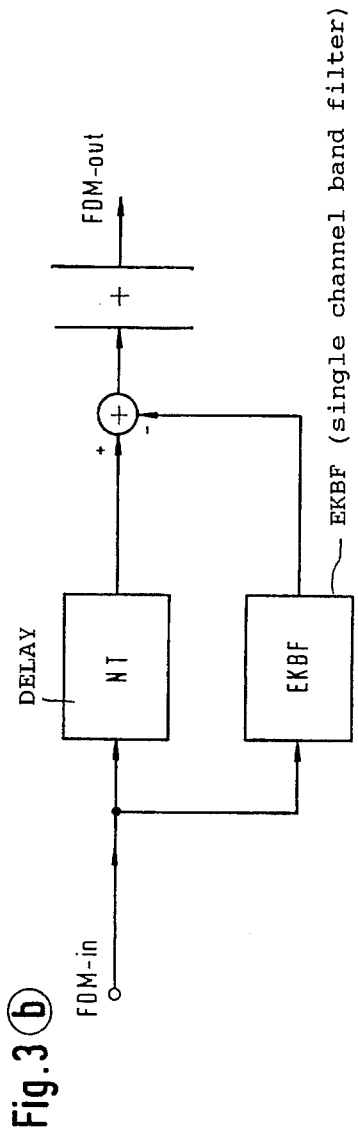
Figure 3:
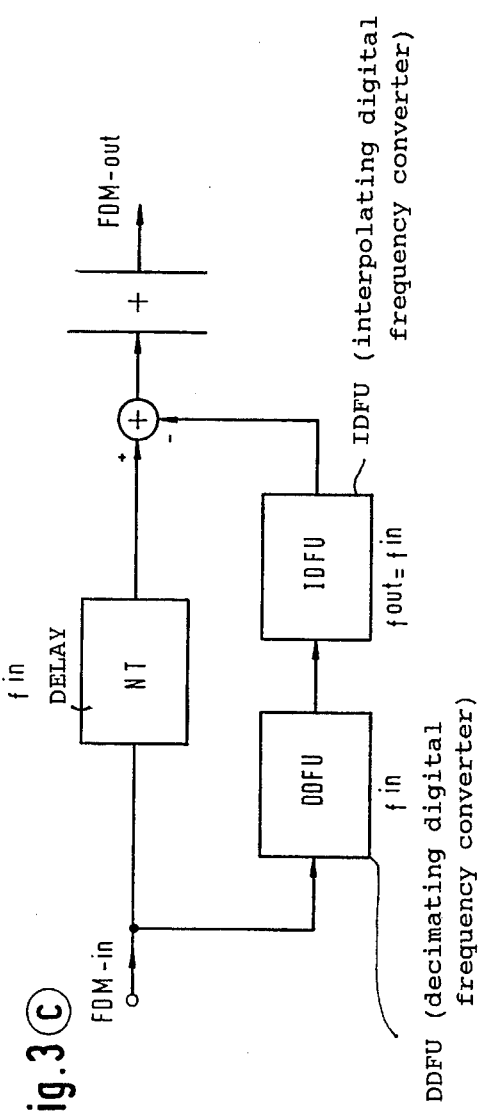

Concerning single channel filter EKS, consider the original structure of FIG. 3a, which represents a direct realization of a very broad band digital filter having a very high scanning frequency $f_A=1/T$ with a narrow steep-flanked blocking gap (notch) and which is extremely elaborate (reduction of scanning rates for reducing the outlay cannot be used). However, FIGS. 3b and 3c show less elaborate realizations of a narrow band single channel filter EKS, making use of all possibilities of digital signal processing for minimizing the total outlay for a drop branch (e.g., BRANCH D).

The solution of FIG. 3b shows how the channel signal to be eliminated from the very broad band spectrum of the incoming FDM-in signal is selected at $f_{in}$ by means of a narrow, steep-flanked single channel band filter EKBF, and subtracted from the incoming broad band spectrum, i.e., added 180° out of phase. This compensation process is possible in an optimal manner exactly at the time when the single channel band filter shows a linear phase (corresponding to a constant group time delay), and when the delay time of the main path through Delay NT is equal to the group time delay of the single channel band filter EKBF.

It is possible to realize the single channel band filter EKBF as a non-recursive finite impulse response (FIR) filter having an exactly linear phase. However, if it were attempted to realize the very narrow band single channel band filter (narrow band in respect to scanning frequency $f_A$) in a closed manner, the outlay would be high, as in FIG. 3a.

By using the multi rate technique of digital signal processing (Bellanger, "Digital Processing of Signals, Theory and Practice", John Wiley & Sons, New York, 1989, chapter 10), the circuit outlay can be drastically reduced. The solution is shown in FIG. 3c, in which the single channel band filter EKBF is replaced by a cascade arrangement of a decimating digital frequency converter DDFU followed by a interpolating digital frequency converter IDFU. The scanning rate is stepped down in the DDFU, and is transposed and stepped up again in the following IDFU to the original value.

Figure 4:
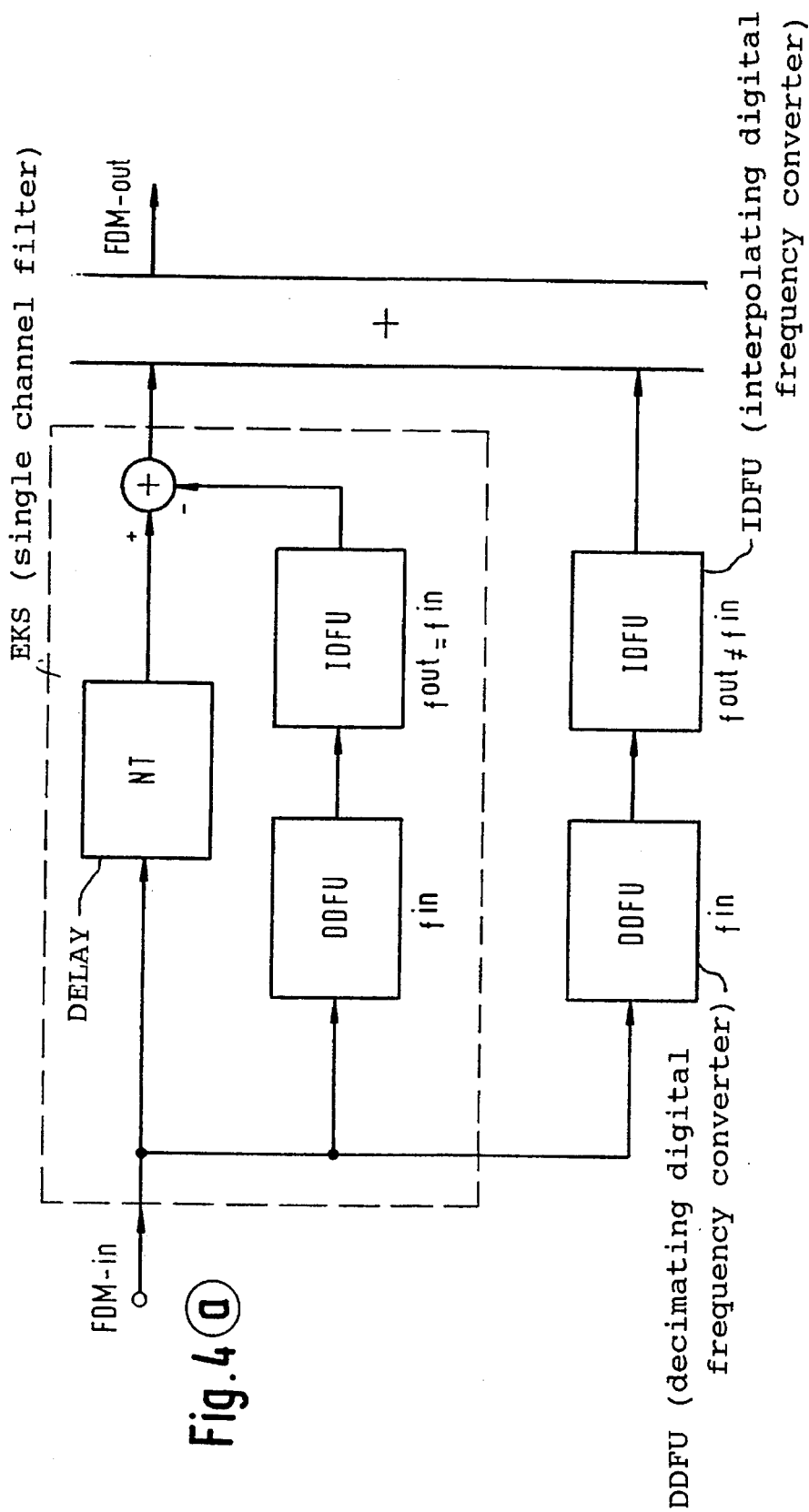
FIGS. 4a and 4b illustrate the realization of a function for changing the channel occupation with still further reduced and with minimal outlay.
Figure 4:
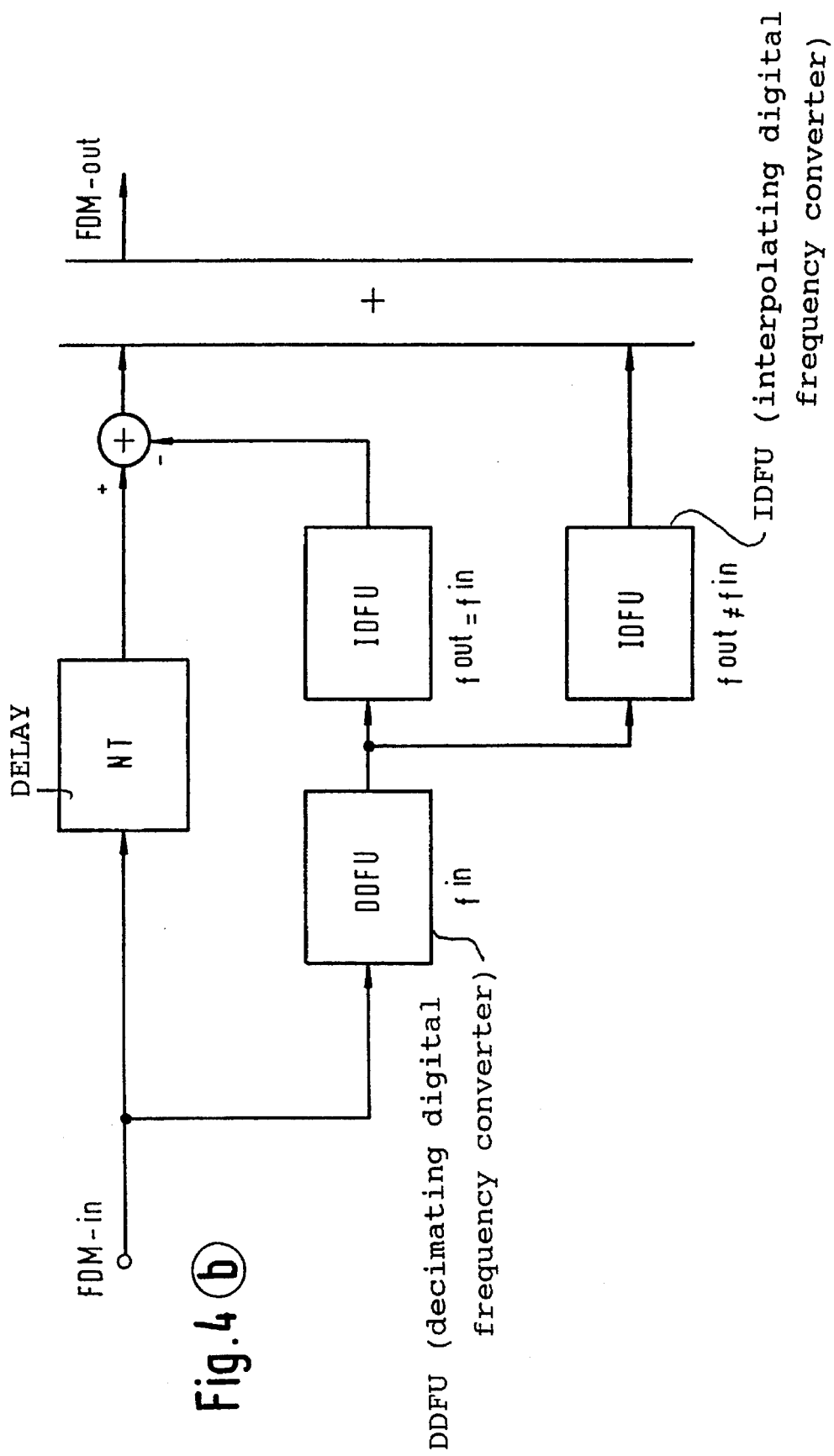

If the structure of FIG. 3c is inserted into BRANCH 1, the add/drop branch, of FIG. 2, this results in an even greater reduction in outlay for changing the channel arrangement. This combination is shown in FIG. 4a. Since the two DDFU blocks perform respectively identical operations, one of them can be omitted, which results in the arrangement of FIG. 4b.

A similar reduction in outlay can also be achieved when replacing a channel signal with another in the same channel frequency (a drop/add branch). In this case BRANCH d/a of FIG. 2 is then given the structure of FIG. 5.

Figure 5:
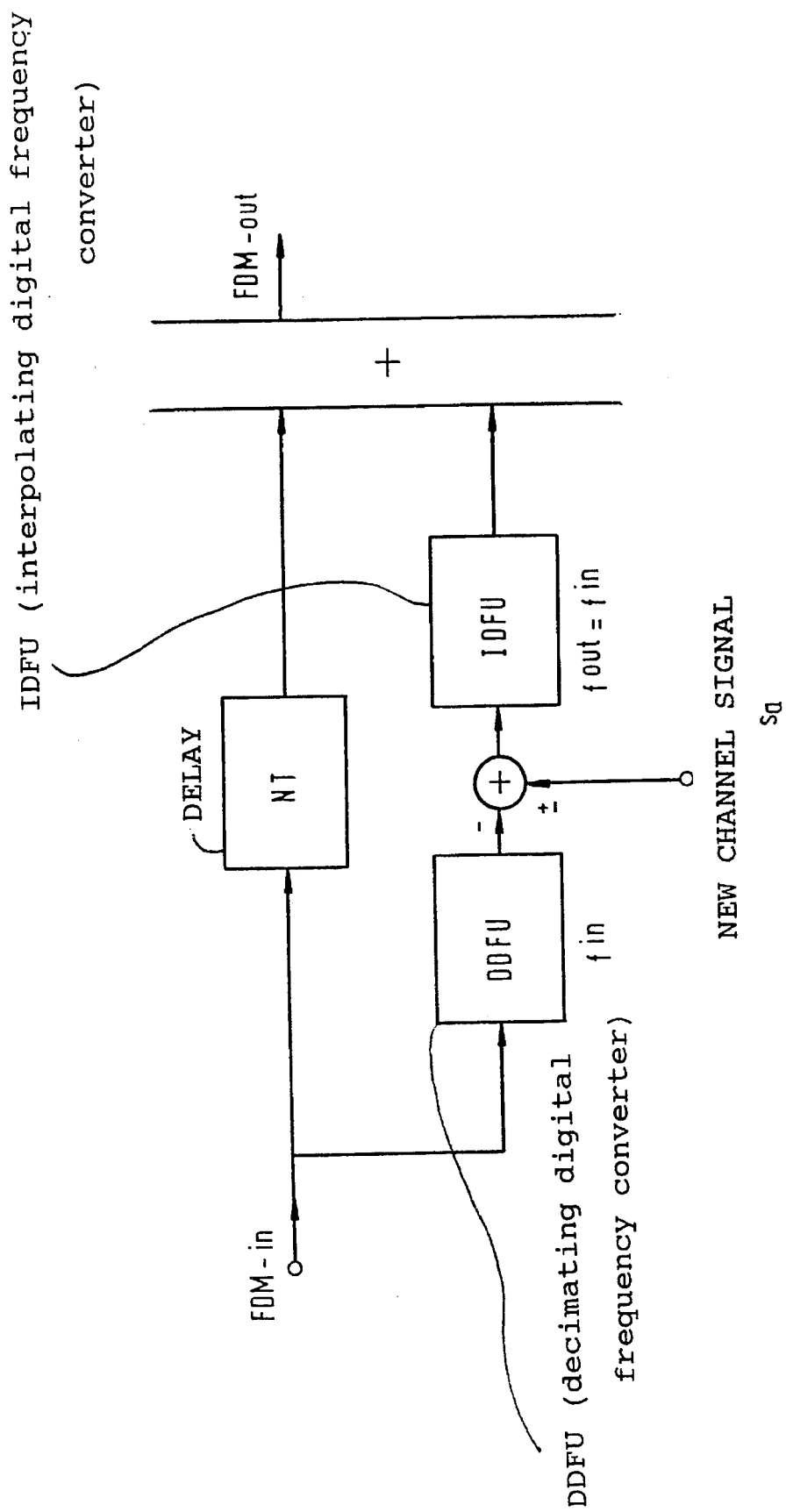
FIG. 5 shows a structure with minimal outlay for the function of replacing a channel signal.
Figure 6:
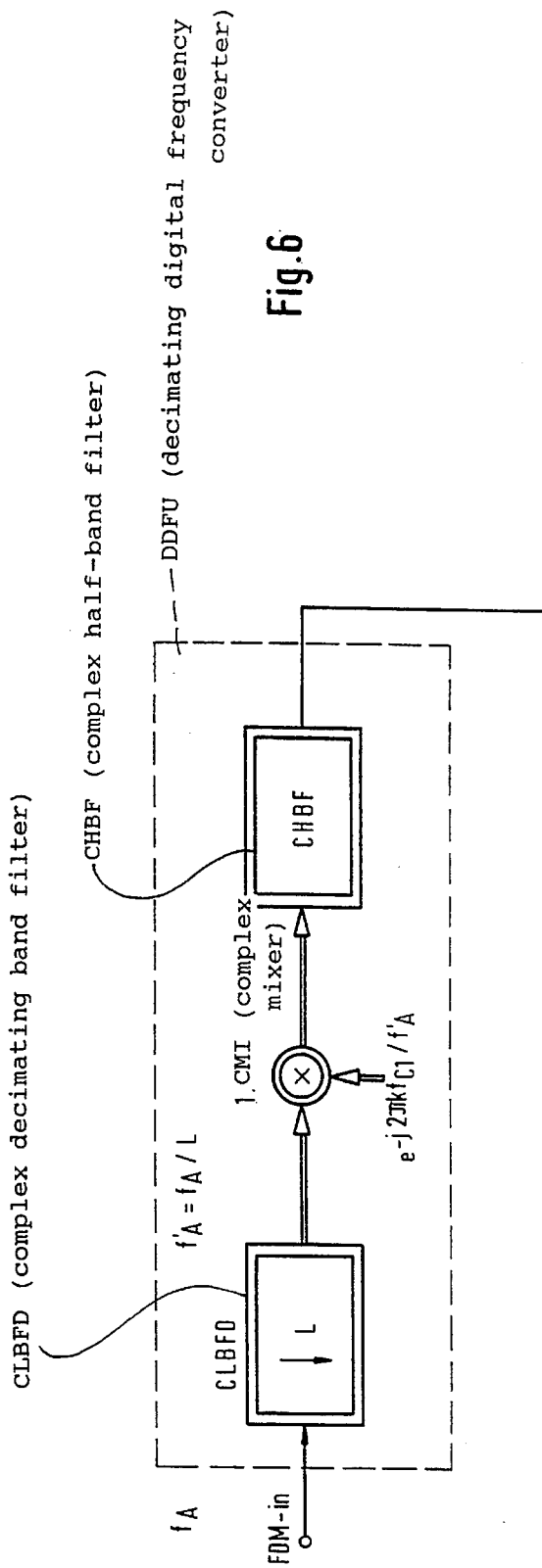
FIG. 6 shows a detailed circuit for replacing one channel signal with another of the same frequency.
Figure 6:
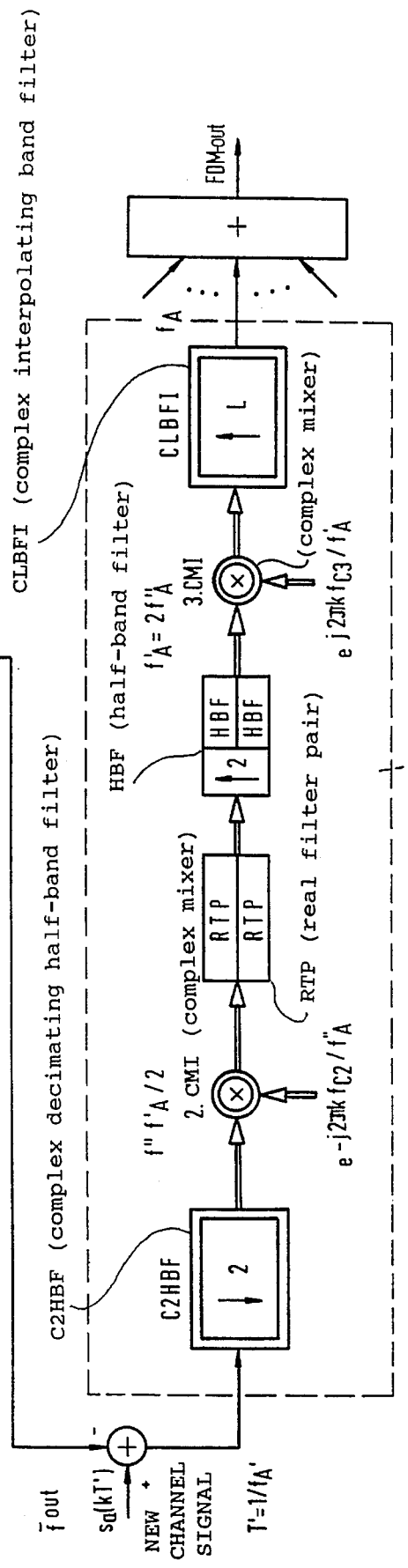

In FIG. 6, a realization of, for example a TV-DADFMU (television drop-add digital frequency multiplex converter), which reduces outlay, is shown for the lower branch of FIG. 5. In this case, the real (or complex) FDM-in signal is transformed into a complex-valued signal by means of complex decimating band filter CLBFD with complex coefficients, along with the simultaneous reduction of the scanning frequency by the factor L: $f_A = f_A/L$.

By means of subsequent first complex mixer 1.CMI, the signal to be eliminated, having the frequency $f_{in}$, is placed into the frequency position $\bar{f}_{out}$ of the channel signal which is to be newly fed in ($\bar{f}_{out}$ relates to the scanning frequency $f_A$ with which the new channel signal is fed in). The complex-valued channel signal to be eliminated is again transformed into a real-valued signal by means of the downstream outlay-reducing complex half-band filter CHBF with complex coefficient (see, for example, German Patent 37 05 207 regarding realization of CHBF).

The DDFU output signal, which can still be occupied by the two directly adjoining channel signals, is subtracted from the new channel signal $s_a$ to be fed in. The new signal to be added, as well as the signal to be eliminated, are super-scanned at least by a factor of 2, i.e., $f_A$ is greater than 4B with the bandwidth B. In this way it is possible to transform the real-valued differential signal back into a complex-valued signal by means of an outlay-reducing complex decimating half-band filter C2HBF with complex coefficients and broad transition areas between the passing and blocking areas. Simultaneously, the super-scanning frequency is halved to $f''_A = f'_A/2$ (C2HBF is described in the above-mentioned Patent 36 21 737).

The subsequent second complex mixer 2.CMI displaces the complex-valued differential signal into a frequency position $\bar{f}_{out} = 0$, or $\pm f''_A/4$, in which the two following pairs of filters, real filter pair RTP and half-band filter pair HBF, can be realized in an outlay-minimizing manner. In FIG. 6, $\bar{f}_{out} = 0$ was assumed, correspondingly $f_{c2} = \bar{f}_{out}$.

Real filter pair RTP is the actual steep-flanked bandlimiting filter which causes the adjacent channel elimination or selection or suppression. It is the most elaborate filter block, however, since it is operated at the lowest possible scanning frequency $f''_A$, the outlay is minimal In many cases, it can also be realized as a half-band filter. Because $f_{out} = 0$, real filter pair RTP has real coefficients and is realized as a pair of identical filters. The same applies to the subsequent pair of filters for doubling the scanning frequency to $f'_A = 2 f''_A$. These filters can always be realized as half-band filters HBF.

The subsequent third complex mixer 3.CMI displaces the differential signal, which after real filter pair RTP only contains spectral components in the referenced channel with a width B, into the desired frequency position $f_{out} = f_{in}$, where $\bar{f}_{out} = 0$, $f_{c3} = f_{out}$ applies.

Finally, the subsequent complex interpolation band filter CLBFI with complex coefficients, which is on the output side, increases the scanning frequency by the factor L to the original value $f_A$. The complex band filters CLBFD and CLBFI can also be realized as a cascade of partial filters which change the scanning rate respectively by a partial factor of L.

It is also possible to feed in the input signal FDM-in with a complex value if the higher channel FDM signal has first been converted into groups. In a corresponding manner the output signal FDM-out can also be complex-valued.

The filters used must have, at least in the partial systems which contribute to the elimination of channel signal (drop function), at least an approximate linear phase (=constant, frequency-independent group time delay). This is preferably achieved by the use of non-recursive finite impulse response (FIR) filters with linear phase (symmetrical pulse response). However, recursive infinite impulse response (IIR) filters with smoothed time delay (for example with an all-pass network) can also be used.

Figure 7:
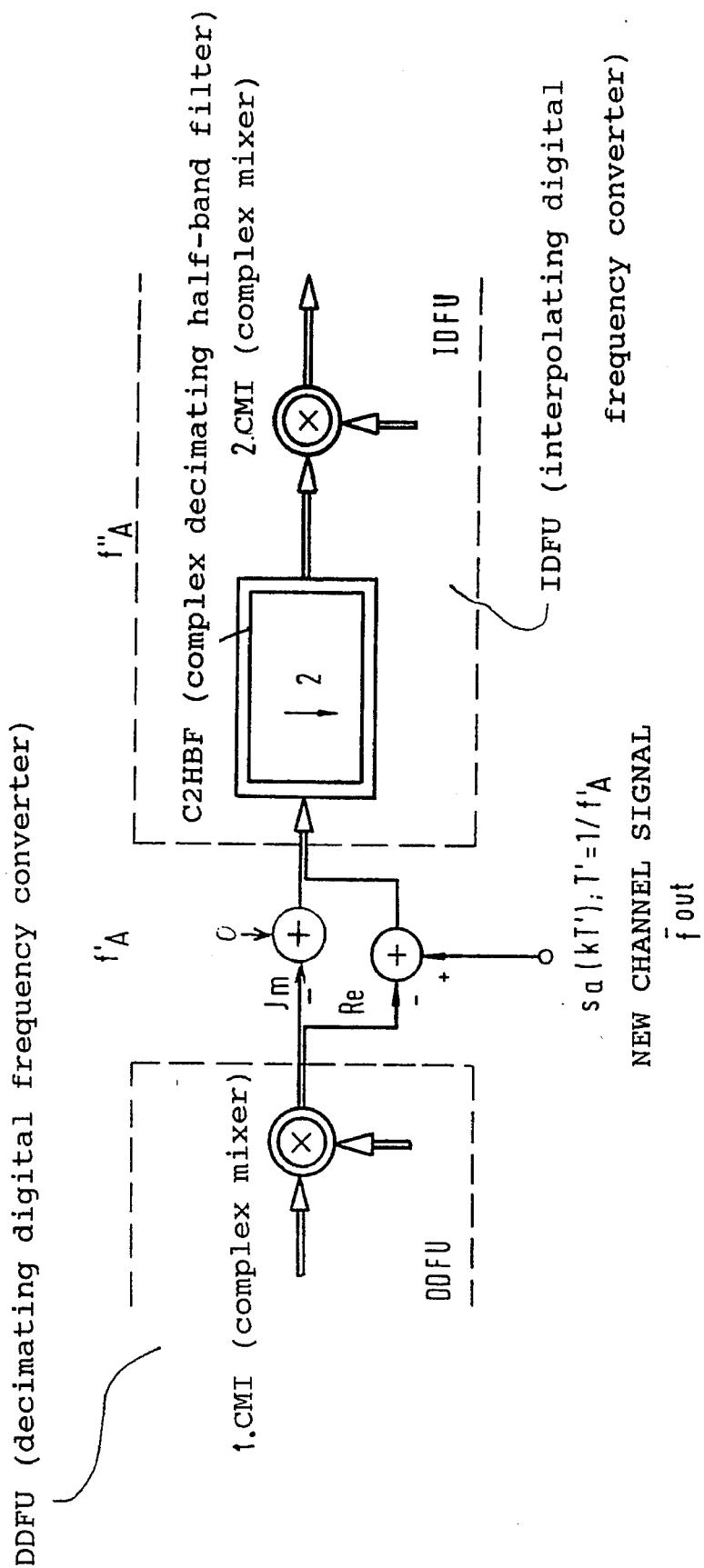
FIG. 7 shows a modification of a portion of FIG. 6 with an advantageous outlay.

It is possible to achieve a further small reduction in outlay, in contrast to the realization in FIG. 6, by means of an arrangement in accordance with FIG. 7. The filters between the first and second complex mixers, namely complex half-band filters CHBF and C2HBF, have the same filter length, i.e., the same coefficient number, but operate at different scanning rates. In the solution in accordance with FIG. 7, the filter CHBF was integrated into the following filter, in the course of which the outlay for C2HBF, which is now fed complex signals, was doubled, but the total outlay is reduced by a factor of ⅓. The new channel signal $s_a$ can be selectively combined with the real part (FIG. 7) or the imaginary part of the complex output signal of the first complex mixer (1.CMI).

The outlay for changing the channel occupation in accordance with FIG. 4b can again be reduced by omitting one IDFU and instead realizing the remaining IDFU in accordance with FIG. 6, with the modification that the third complex mixer 3.CMI and the complex interpolating band filter CLBFI at the output side are provided twice.

It will be understood that the above description of the present invention is susceptible to various modifications, changes, and adaptations, and the same are intended to be comprehended within the meaning and range of equivalents of the appended claims.

What is claimed is:

1. A drop-and-add multiplexer for receiving an incoming FDM signal with a plurality of channels, for receiving signals of additional channels, and for outputting an outgoing FDM signal, the multiplexer comprising:

at least one single channel filter means for receiving an incoming FDM signal, filtering the incoming FDM signal by blocking a selected channel frequency, and outputting a filtered FDM signal;

at least one interpolating digital frequency converter for receiving another channel signal which is not in the incoming FDM signal, converting the other channel signal into a channel frequency which has been blocked by the at least one single channel filter means or was an empty channel frequency in the incoming FDM signal, and outputting a converted other channel signal;

at least one digital frequency converter, comprising a cascade connection of a decimating digital frequency converter and an interpolating digital frequency converter, for receiving the incoming FDM signal, frequency-converting a selected channel from an input frequency to a different outgoing frequency, and outputting a frequency-converted channel signal;

adding means for adding the converted other channel signal output by the interpolating digital frequency converter, the filtered FDM signal output by the single channel filter means, and the frequency-converted channel signal output by the digital frequency converter, and outputting an outgoing FDM signal.

2. A drop-and-add multiplexer in accordance with claim 1, wherein the single channel filter means comprises:

a first path for receiving the incoming FDM signal and producing an output signal;

a second path for receiving the incoming FDM signal and producing an output signal; and an adder for adding the output signals of the first and second paths;

wherein the first path includes means for connecting the incoming FDM signal through as the output signal to the adder;

wherein the second path has a single channel band filter for receiving and filtering the incoming FDM signal, and has a sign inverter for inverting the filtered FDM signal and outputting the inverted filtered FDM signal as the output signal to the adder.

3. A drop-and-add multiplexer in accordance with claim 2, wherein the single channel band filter comprises a cascade connection of a digital decimating frequency converter and an interpolating digital frequency converter.

4. A drop-and-add multiplexer in accordance with claim 3, wherein the digital decimating frequency converter comprises a cascade connection of a complex decimating band filter, a first complex mixer, and a complex half-band filter.

5. A drop-and-add multiplexer for receiving an incoming FDM signal with a plurality of channels, for receiving signals of additional channels, and for outputting an outgoing FDM signal, the multiplexer comprising:

at least one single channel filter means for receiving an incoming FDM signal, filtering the incoming FDM signal by blocking a selected channel frequency, and outputting a filtered FDM signal;

at least one interpolating digital frequency converter for receiving another channel signal which is not in the incoming FDM signal, converting the other channel signal into a channel frequency which has been blocked by the at least one single channel filter means or was an empty channel frequency in the incoming FDM signal, and outputting a converted other channel signal;

at least one digital frequency converter, comprising a cascade connection of a decimating digital frequency converter and an interpolating digital frequency converter, for receiving the incoming FDM signal, frequency-converting a selected channel from an input frequency to a different outgoing frequency, and outputting a frequency-converted channel signal;

adding means for adding the converted other channel signal output by the interpolating digital frequency converter, the filtered FDM signal output by the single channel filter means, and the frequency-converted channel signal output by the digital frequency converter, and outputting an outgoing FDM signal;

wherein the single channel filter means comprises:

a first path for receiving the incoming FDM signal and producing an output signal;

a second path for receiving the incoming FDM signal and producing an output signal; and an adder for adding the output signals of the first and second paths;

wherein the first path includes means for connecting the incoming FDM signal through as the output signal to the adder;

wherein the second path has a single channel band filter for receiving and filtering the incoming FDM signal, and has a sign inverter for inverting the filtered FDM Signal and outputting the inverted filtered FDM signal as the output signal to the adder wherein the single channel band filter comprises a cascade connection of a digital decimating frequency converter and an interpolating digital frequency converter;

wherein the decimating digital frequency converter of said at least one digital frequency converter and the decimating digital frequency converter of said single channel band filter, are a single decimating digital frequency converter, and wherein an output signal of the single decimating digital frequency converter is provided to both the interpolating digital frequency converter of said at least one digital frequency converter and to the interpolating digital frequency converter of said single channel band filter.

6. A drop-and-add multiplexer in accordance with claim 2, wherein the means for connecting of the first path comprises delay means for compensating for a time delay of the single channel band filter in the second path, wherein the incoming FDM signal is delayed in the first path by the delay means to have the same time delay as the single channel band filter of the first path.

7. A drop-and-add multiplexer in accordance with claim 6, wherein the interpolating digital frequency converter comprises a cascade connection of a complex decimating half-band filter, a second complex mixer, a pair of real filters, a pair of interpolating half-band filters, a third complex mixer, and an interpolating complex band filter.

8. A drop-and-add multiplexer in accordance with claim 6, wherein the single channel band filter comprises a cascade connection of a digital decimating frequency converter and an interpolating digital frequency converter.

9. A drop-and-add multiplexer in accordance with claim 8, wherein the digital decimating frequency converter comprises a cascade connection of a complex decimating band filter, a first complex mixer, and a complex half-band filter.

10. A drop-and-add multiplexer in accordance with claim 8, wherein the interpolating digital frequency converter comprises a cascade connection of a complex decimating half-band filter, a second complex mixer, a pair of real filters, a pair of interpolating half-band filters, a third complex mixer, and an interpolating complex band filter.

11. A drop-and-add multiplexer in accordance with claim 8, wherein a single decimating digital frequency converter is provided as the decimating digital frequency converter of said at least one digital frequency converter and as the decimating digital frequency converter of said single channel band filter, wherein an output signal of the single decimating digital frequency converter is provided to both the interpolating digital frequency converter of said at least one digital frequency converter and to the interpolating digital frequency converter of said single channel band filter.

12. A drop-and-add multiplexer in accordance with claim 11, wherein the interpolating digital frequency converter of the at least one digital frequency converter and the interpolating digital frequency converter of the single channel band filter, comprise a single interpolating digital frequency converter;

wherein the single digital decimating frequency converter comprises a cascade connection of a complex decimating band filter, a first complex mixer, and a complex half-band filter; and wherein the single interpolating digital frequency converter comprises a cascade connection of a complex decimating half-band filter, a second complex mixer, a pair of real filters, a pair of interpolating half-band filters, a third complex mixer, and a first interpolating complex band filter.

13. A drop-and-add multiplexer for receiving an incoming FDM signal with a plurality of channels, for receiving signals of additional channels, and for outputting an outgoing FDM signal, the multiplexer including means for replacing a channel in the incoming FDM signal with a new channel signal in the outgoing FDM signal, said means for replacing comprising:

a first path and a second path, said first path and said second path receiving the incoming FDM signal;

wherein the first path includes a delay means for receiving the incoming FDM signal and outputting a delayed signal; and wherein the second path includes:

a decimating digital frequency converter and an inverter for receiving the incoming FDM signal and outputting an inverted output signal;

an adder for receiving the inverted output signal from the decimating digital frequency converter, for receiving a new channel signal which is not in the incoming FDM signal with positive or negative signs, and for producing an added output signal; and an interpolating digital frequency converter for receiving the added output signal and producing an output signal;

wherein the delayed signal from the first path and the output signal from the interpolating digital frequency converter of the second path are combined in a further adder to produce the outgoing FDM signal;

wherein a channel signal in the incoming FDM signal to be replaced is eliminated in the outgoing FDM signal and replaced by the new channel signal.

14. A drop-and-add multiplexer in accordance with claim 13, wherein the interpolating digital frequency converter comprises a cascade connection of a complex decimating half-band filter, a second complex mixer, a pair of real filters, a pair of interpolating half-band filters, a third complex mixer, and an interpolating complex band filter.

15. A drop-and-add multiplexer in accordance with claim 13, wherein the digital decimating frequency converter comprises a cascade connection of a complex decimating band filter, a first complex mixer, and a complex half-band filter.

16. A drop-and-add multiplexer in accordance with claim 15, wherein the interpolating digital frequency converter comprises a cascade connection of a complex decimating half-band filter, a second complex mixer, a pair of real filters, a pair of interpolating half-band filters, a third complex mixer, and an interpolating complex band filter.

17. A drop-and-add multiplexer in accordance with claim 16, wherein, in the cascade connection of the decimating digital frequency converter and the interpolating digital frequency converter, the complex half-band filters and the complex decimating half-band filter are formed by a single complex filter means, and the new channel signal is combined in the adder with the real part or the imaginary part of a complex output signal of the first complex mixer.

18. A drop-and-add multiplexer in accordance with claim 5, wherein the interpolating digital frequency converter of the at least one digital frequency converter and the interpolating digital frequency converter of the single channel band filter, comprise a single interpolating digital frequency converter;

wherein the single digital decimating frequency converter comprises a cascade connection of a complex decimating band filter, a first complex mixer, and a complex half-band filter; and wherein the single interpolating digital frequency converter comprises a cascade connection of a complex decimating half-band filter, a second complex mixer, a pair of real filters, a pair of interpolating half-band filters, a third complex mixer, and a first interpolating complex band filter.

\* \* \* \* \*